(12) United States Patent
Lee (10) Patent No.: US 7,900,364 B2
(45) Date of Patent: Mar. 8, 2011

(54) DRAWING APPARATUS UTILIZING MEASURING TAPE

(76) Inventor: Arinoll Lee, Gimcheon-si (KR)

( * ) Notice: Subject to any disclaimer, the term of this patent is extended or adjusted under 35 U.S.C. 154(b) by 0 days.

(21) Appl. No.: 12/593,915

(22) PCT Filed: Apr. 3, 2008

(86) PCT No.: PCT/KR2008/001877
§ 371 (c)(1),
(2), (4) Date: Sep. 29, 2009

(87) PCT Pub. No.: WO2008/127000
PCT Pub. Date: Oct. 23, 2008

(65) Prior Publication Data
US 2010/0115777 A1 May 13, 2010

(30) Foreign Application Priority Data
Apr. 11, 2007 (KR) .................. 10-2007-0035357

(51) Int. Cl.
*B43L 9/04* (2006.01)
*G01B 3/10* (2006.01)
(52) U.S. Cl. .............. 33/27.03; 33/759; 33/770
(58) Field of Classification Search ............ 33/27.01, 33/27.02, 27.03, 758, 759, 760, 770
See application file for complete search history.

(56) References Cited

U.S. PATENT DOCUMENTS

| | | | |
|---|---|---|---|
| 2,624,117 A * | 1/1953 | Paci | 33/27.03 |
| 3,906,639 A * | 9/1975 | Wilamowski | 33/27.03 |
| 4,976,037 A | 12/1990 | Hines | |
| 5,735,052 A * | 4/1998 | Lin | 33/27.03 |
| 5,987,760 A * | 11/1999 | Hsu | 33/27.03 |
| 6,907,669 B1 * | 6/2005 | Han et al. | 33/27.03 |
| 7,191,530 B1 * | 3/2007 | Thibodeaux | 33/27.032 |
| 2005/0155234 A1 * | 7/2005 | Xieh | 33/27.03 |
| 2008/0098610 A1 * | 5/2008 | Lipps | 33/770 |
| 2010/0095545 A1 * | 4/2010 | Miller | 33/701 |

FOREIGN PATENT DOCUMENTS

| | | |
|---|---|---|
| JP | 10-176901 | 6/1998 |
| KR | 10-0572678 | 4/2005 |

* cited by examiner

*Primary Examiner* — G. Bradley Bennett
(74) *Attorney, Agent, or Firm* — Christopher Paul Mitchell

(57) ABSTRACT

Disclosed are an arc-drawing assisting apparatus and a tape measure including the arc-drawing assisting apparatus. The an arc-drawing assisting apparatus, which is disposed at a tape of a tape measure so as to allow a user to draw a circle or an arc by using the tape measure, includes an upper case having a graduation checking part for checking graduations of the tape, the graduations checking part being formed at one surface of an upper portion of the upper case and a center adjusting member which is rotatably assembled with the upper case and includes a lower case having an assembling protuberance, which has a center fixing pin protruding downward, formed at a lower end of the lower case. The an arc-drawing assisting apparatus includes a center adjusting member, which is movably disposed at a tape having graduations formed thereon and is also fixed in the tape when an arc is drawn, a center adjusting assisting member, which is assembled with the center adjusting member and has an angle indicator, and a writing instrument fixing member allowing a writing instrument to be fixed to a front end of the tape so that a circle and an arc in an accurate dimension can be drawn, and they can be drawn at a desire angle.

24 Claims, 6 Drawing Sheets

DRAWING APPARATUS UTILIZING MEASURING TAPE

RELATED APPLICATIONS

This application is a 371 application of International Application No. PCT/KR2008/001877, filed Apr. 3, 2008, which in turn claims priority from Korean Patent Application No. 10-2007-0035357, filed Apr. 11, 2007, both of which are incorporated herein by reference.

TECHNICAL FIELD

The present invention relates to an arc-drawing-assisting apparatus and a tape measure including the assisting apparatus, and more particularly to an arc-drawing-assisting apparatus, which includes a center adjusting member, which is movably disposed at a tape having graduations and is also fixed in the tape when an arc is drawn, and a writing instrument fixing member allowing a writing instrument to be fixed to a front end of the tape so that a circle and an arc in an accurate dimension can be drawn, and a circle and an arc having a desired angle can be drawn.

BACKGROUND ART

In general, a tape measure assisting apparatus for drawing an arc includes a fixing member, which presses and fixes a tape of a tape measure and is fixed to a center of a circle or a arc, and a writing instrument fixing part capable of fixing the writing instrument, and a tape measure integrally including such a tape measure assisting apparatus for drawing an arc.

In general, a tape measure is a measure having a long belt-shape, which is formed by engraving graduations on a thin cloth, metal, etc. Measures made from cloth, synthetic fiber, reinforce glass fiber, etc. are typically used for measuring a comparative long distance, and measures made from metal such as stainless steel are used for measuring a distance within 10 m in constructing buildings, etc.

Particularly, measures used in constructing buildings can measure a distance within a range of 2~10 m. In such measures, graduations are displayed in various dimensions such as the dimension of inch or feet as well as in the dimension of cm or m.

Meanwhile, under constructing buildings or interiors thereof, or under wood processing works, it often occurs to measure a distance and to draw a circle or an arc. However, a conventional tape measure is easily used for measuring a distance, but is not suitable for drawing a circle or arc having a predetermined diameter.

Meanwhile, in order to improve such a conventional problem, such a scheme for including an arc-drawing-assisting apparatus in a tape measure or a scheme for integrally including such an assisting apparatus in a case of a tape measure has been suggested.

Figure 1:
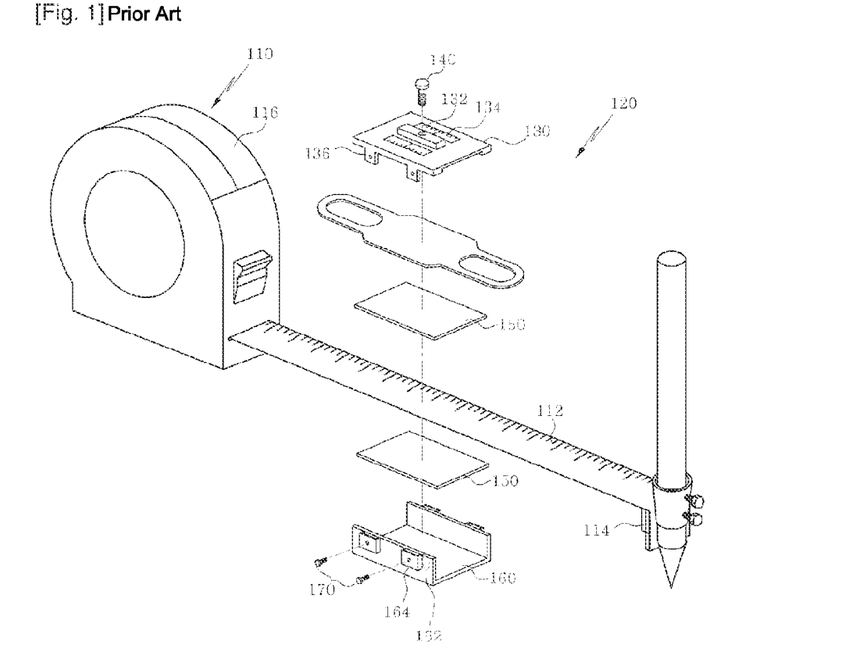
FIG. 1 is a view illustrating a tape measure including a conventional arc-drawing-assisting apparatus.

FIG. 1 is a view illustrating a conventional arc-drawing-assisting apparatus and a tape measure including the assisting apparatus.

As shown, the conventional arc-drawing-assisting apparatus and the tape measure including the assisting apparatus include a tape measure 110, which includes a case 116 receiving a tape 112 having graduations displayed thereon and a fixing lock disposed at an end of the tape measure so as to be locked to an object to be measured, and arc-drawing-assisting apparatus 120, which includes an upper case 130, which is included in an upper portion of the tape 112 and has a screw receiving part 132 formed at an upper side of the upper case 130 and a graduation checking plate 134, a fixing screw 140 assembled with the screw receiving part 132 formed on the upper case 130, a pressing plate 150 pressing the tape 112 through fastening of the fixing screw 140, a fixing needle 162 fixing a center of a circle or an arc, and a lower case 160 included at a lower portion of the tape 112 so as to be assembled with the upper case 130.

Particularly, the upper case 130 and the lower case 160 of the arc-drawing-assisting apparatus 120 have assembling protuberances 136 and protuberance receiving parts 164, respectively. Therefore, the upper case 130 and the lower case 160 are assembled with each other in such a manner that each assembling protuberance 136 is received in each corresponding protuberance receiving part 164 and each tightening screw 170 is assembled between them. Also, the pressing plate 150, which presses the tape 112 so as to prevent the center of a circle or an arc from being changed when the arc-drawing-assisting apparatus 120 draws the circle or the arc, is disposed between the upper case 130 and the lower case 160. The fixing screw 140 pressing the pressing plate 150 is assembled with the screw receiving part 132 of the upper case 130.

However, the conventional arc-drawing assisting apparatus and the tape measure including the assisting apparatus can not draw a circle or an arc in an accurate dimension or an arc at each angle, and has a structure assembled by a plurality of screws so that assembling force can be lessened when the screws are missed, thereby remarkably lowering efficiency in operation.

DISCLOSURE OF INVENTION

Technical Problem

The present invention has been made in view of the above-mentioned problems, and the present invention provides an arc-drawing assisting apparatus, which includes a center adjusting member, which is movably disposed at a tape having graduations and is also fixed in the tape when an arc is drawn, a center adjusting assisting member, which is coupled with the center adjusting member and has an angle indicator, and a writing instrument fixing member formed at a front end of the tape so as to allow a writing instrument to be fixed thereto so that a circle and an arc in an accurate dimension can be drawn, and a circle and an arc can be drawn at a desire angle.

Also, the present invention provides an assisting apparatus included in a tape measure so as to allow a circle and an arc to be drawn by means of the tape measure, the assisting apparatus including a center adjusting member, which includes an upper case having a graduation checking part for checking graduations of the tape, which is formed at one surface of an upper part of the upper case, and a lower case, which is rotatably assembled with the upper case and has an assembling protuberance part, which is formed at a lower end of the lower case and has a center fixing pin protruding downward.

Technical Solution

In accordance with an aspect of the present invention, there is provided a tape measure including an arc-drawing-assisting apparatus including: a tape having graduations displayed thereon; a case receiving the tape; a fixing lock, which is disposed at a front end of the tape and is fixed by a rivet; a center adjusting member which has an upper case having a graduation checking part for checking graduations of the tape, which is formed at one surface of an upper part of the upper case, and a lower case, which is rotatably assembled with the upper case and has an assembling protuberance part having a center fixing pin, which is formed at a lower end of the lower case while protruding downward; a center adjusting assisting member assembled with the assembling protuberance part of the center adjusting member so as to allow a circle or an arc at each angle to be drawn; and a writing instrument fixing member assembled with the fixing lock included in the front end of the tape so as to fix a writing instrument.

MODE FOR THE INVENTION

Hereinafter, an exemplary embodiment of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

Figure 2:
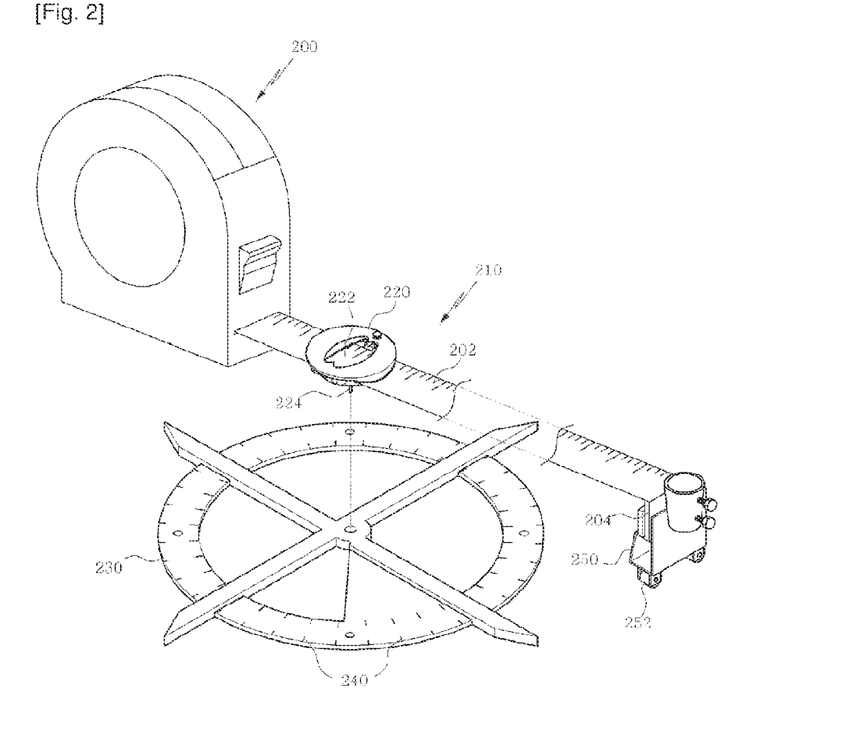
FIG. 2 is a view illustrating an arc-drawing-assisting apparatus and a tape measure including the assisting apparatus according to an exemplary embodiment of the present invention.
Figure 3:
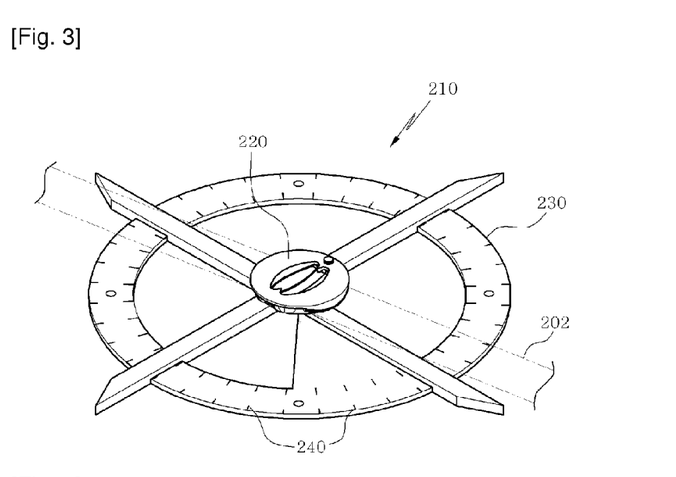
FIG. 3 is a view illustrating a state of an arc-drawing-assisting apparatus according to an exemplary embodiment of the present invention being assembled.

FIG. 2 is a view illustrating an arc-drawing-assisting apparatus and a tape measure including the assisting apparatus according to an exemplary embodiment of the present invention, and FIG. 3 is a view illustrating a state of an arc-drawing-assisting apparatus according to an exemplary embodiment of the present invention being assembled.

As shown, assembly of an arc-drawing-assisting apparatus according to an exemplary embodiment of the present invention and a tape measure including the arc-drawing-assisting apparatus includes: the tape measure 200, which includes a tape 202 having graduations displayed thereon and a fixing lock 204 formed at a front end of the tape 202, and the arc-drawing-assisting apparatus, which includes: a center adjusting member 220, which allows the tape 202 to be inserted therethrough and has a graduations checking part 222, which can check graduations of the inserted tape 202, formed at an upper portion thereof, and a center fixing pin 224, which is fixed at a position corresponding to the center of a circle or an arc, formed at a lower end thereof; a center adjusting assisting member 230, which is disposed at a lower portion of the center adjusting member 220 and has an angle indicator 240 so as to allow a user to draw a circle or an arc having each angle; and a writing instrument fixing member 250, which is assembled with a fixing lock 204 formed at a front end of the tape 202 so as to allow a writing instrument (not shown) to be fixed therein and has wheels 252 formed at a lower portion thereof.

The tape measure 200 has a structure, in which the tape 202 having graduations displayed thereon is rolled in a circle-shape and is automatically rolled within a case of the tape measure by means of a spring (not shown) included in the interior of the tape measure 200 when the user pulls and then releases it. Also, the fixing lock 204 bent downward is disposed at the front part of the tape 202 so as to be locked on one surface of an object to be measured, and one upper surface of the fixing lock 204 is fixed to the front part of the tape 202 by a rivet, etc.

The arc-drawing-assisting apparatus 210 is disposed at the tape 202 of the tape measure structured as described above so as to allow the user to draw a circle or an arc having an accurate diameter by using the tape measure 200.

Hereinafter, the arc-drawing-assisting apparatus 210 will be described.

Figure 4:
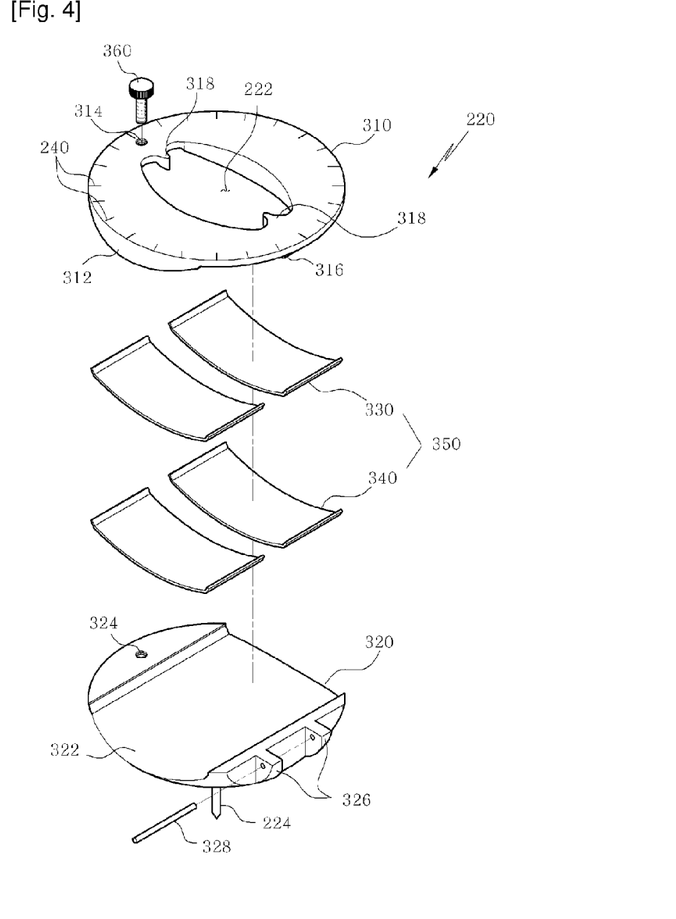
FIG. 4 is an exploded perspective view of a center adjusting member of an arc-drawing-assisting apparatus according to an exemplary embodiment of the present invention.
Figure 5:
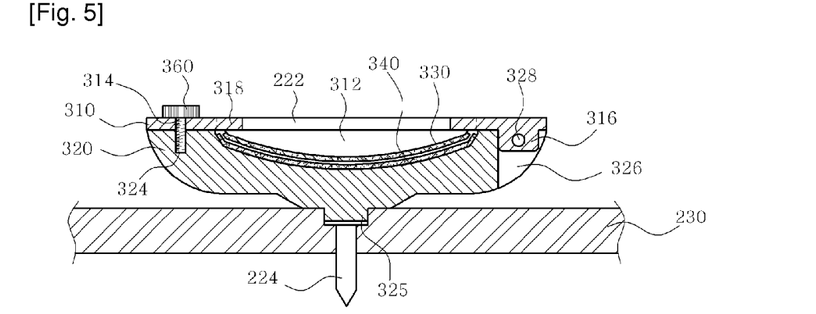
FIG. 5 is a sectional view of a center adjusting member of an arc-drawing-assisting apparatus according to an exemplary embodiment of the present invention, in which the arc-drawing-assisting apparatus is assembled.

FIG. 4 is an exploded perspective view of the center adjusting member of the arc-drawing-assisting apparatus according to an exemplary embodiment of the present invention, and FIG. 5 is a sectional view of the center adjusting member of the arc-drawing-assisting apparatus according to an exemplary embodiment of the present invention, in which the assisting apparatus is assembled.

The center adjusting member 220 of the arc-drawing-assisting apparatus according to an exemplary embodiment of the present invention allows a user to draw a circle or an arc in a state where the tape 202 is inserted into the center adjusting member 220, and the center fixing pin 224 is fixed to the center of an circle or an arc so as to maintain a predetermined diameter. The center adjusting member 220 includes an upper case 310 and a lower case 320, compressing meanses 350, and a fixing means 360.

The upper case 310 is a case disposed at an upper side of the center adjusting member 220 and has an entire circle-shape in a plane view. The upper case 310 includes a graduation checking part 222, which can check graduations formed on the tape 202 of the tape measure 200, formed at the center portion of the upper case, and an upper curved part 312, which is curved downward, formed at a lower side of the upper case. Also, the upper case 310 has a fixing hole 314 to be assembled with the fixing means 360, which will be described below, formed at one side thereof and a rotating part 316 formed at the other side thereof so as to be rotatably assembled with the lower case 320.

Herein, the fixing hole 314 may have screw threads formed along a circumferential surface thereof, but the fixing hole is not limited to this shape. Therefore, the fixing hole can be formed while having various shapes such as a simple hole-shape, etc., which will be described below.

Herein, the graduation checking part 222 of the upper case 310 has a graduation display member (not shown), etc. attached thereto, which has graduations equal to graduations of the tape 202 of the tape measure 200, if the graduations of the tape 202 inserted into the center adjusting member 220 can be observed by the user. Meanwhile, the graduation checking part 222 is made from transparent material so as to allow the user to check graduations of the tape 202 under the graduation checking part 222. As such, graduations of the tape can be checked by means of various schemes.

However, as shown in FIG. 4, an upper side of the upper case is opened so as to allow the user to directly check graduations of the tape 202 disposed at a lower side of the upper case 310, and a graduation stylus 318, which points to graduations of the tape 202, is formed at one surface of the graduation checking part 222 so as to allow a user to accurately check graduations of the tape 202.

It is preferable that at least one graduation stylus 318 is formed at one inner circumferential surface of the graduation checking part 222, and it is further preferable that two graduation styluses 318 are formed at both sides of the graduation checking parts 222 while facing each other.

Additionally, in order to allow a graduation of the tape 202, to which the graduation styluses 318 of the graduation checking part 222 point, to be equal to a graduation, at which the center fixing pin 224 of the center adjusting member 220 is positioned, it is preferable that a direction, in which the graduation styluses 318 point, and the center of the center adjusting member 220 perpendicularly intersect with each other.

The angle indicator 240 is disposed at an upper circumferential surface of the upper case 310 so as to allow a user to draw an arc at each angle. The angle indicator 240 may be formed integrally with the upper case 310 and also may be included in the upper case 310 as a separate part in such a manner that it is attached to the upper side of the upper case 310 by adhesives, etc.

The lower case 320 is assembled with a lower portion of the upper case 310 in such a manner that the lower case 320 can rotate in up and down directions and has a circle-shape so as to be accurately assembled with the upper case 310. Also, the lower case 320 has an assembling groove 324 formed at a position thereof, which corresponds to the fixing hole 314 formed at the upper case 310.

Herein, screw threads may be formed along an inner circumferential surface of the assembling groove 324, but the shape of the assembling groove 324 may not be limited to screw threads. Therefore, the assembling groove 324 may be formed in various shapes such as a simple hole, etc., which will be described. Also, rotating pin fixing parts 326 are formed at a position of the lower case 320, which corresponds to a rotating part 316 of the upper case 310, so as to be positioned at both sides of the rotating part 316, respectively. Therefore, a rotating pin 328 is inserted through the rotating pin fixing parts 326 and the rotating part 316 so that the lower case 320 is assembled with the upper case 310 in such a manner that the lower case 320 can rotate in up an down directions.

Also, a lower curved part 322 is formed at a central portion of the lower case 320, and has a curved part, which is curved downward and has a size equal to or larger than the size of a curved surface of an upper curved part 312 as large as a predetermined size while having a center equal to the center of the upper curved part 312, so as to be assembled with the upper curved part 312. The lower case 320 has an assembling protuberance 325 protruding downward from a center of a lower end thereof, which is assembled with a center adjusting assisting member 230, which will be described below.

Herein, the assembling protuberance 325 is assembled with the center adjusting member 220 and the center adjusting assisting member 230. Preferably, the assembling protuberance has a ring-shape so as to allow a circle or an arc to be drawn while the center adjusting member 220 rotates and is rotatably assembled with the center adjusting assisting member.

Also, in order to allow the center adjusting member 220 and the center adjusting assisting member 230 to be rotated together with each other, the center fixing pin 224 is fixed in a lower end of the assembling protuberance 325, and the assembling protuberance 325 is inserted into the center adjusting assisting member 230. Also, it is preferable that the assembling protuberance 325 has a shape of a half-moon such as D or a annular shape and includes serrations (not shown) formed at an outer circumferential surface thereof so as to be inserted into and assembled with the center adjusting assisting member 230. However, the shape of the assembling protuberance 325 is not limited to the above described shape, and it is also preferable that a separate component to be additionally assembled with the assembling protuberance 325 is manufactured so as to allow only the center adjusting member 220 to be rotated as the case may be.

In addition, the center fixing pin 224 can be fixed to and assembled with the assembling protuberance 325 of the lower case 320 in various manners. These will be described below.

The compressing meanses 350 are thin plates and are formed within a range where they are not exposed out of the upper case 310 and the lower case 320. A plurality of compressing meanses is assembled with each case 310 and 320. The compressing meanses 350 are divided into upper compressing meanses 330 assembled with the upper curved part 312 of the upper case 310 and lower compressing meanses 340 assembled with the lower curved part 322 of the lower case 320.

It is preferable that such compressing meanses 350 are attached to the upper case 310 and the lower case 320 by means of adhesives, etc. Also, it is possible that each groove is formed at each case 310 and 320 so as to allow the compressing meanses to be inserted into each groove.

The upper compressing meanses 330 are coupled with the upper curved part 312 so as to compress the tape 202 while drawing a circle or an arc. Therefore, graduations of the tape 202 are accurately identified and the center of a circle or an arc is surely fixed so that the user can draw the circle or the arc in a further convenient manner.

It is preferable that each compressing means 330 is disposed between the periphery of both sides of the graduation checking part 222 and a circumferential surface of the upper case 310 so as not to cover the graduation checking part 222 of the upper case 310. However, the positions of the compressing meanses are not limited to those, and it is also possible that the compressing meanses made from transparent material are assembled with the upper curved part 312 so as to allow the user to easily check graduations of the tape through the graduation checking part 222.

Herein, in a case where each upper compressing means 330 is made from transparent material, it is preferable that only a portion of each upper compressing means 330, which corresponds to the graduation checking part 222 for allowing the user to check graduations, is made from transparent material, but this is not limited. It is also possible that the entire upper compressing means 330 is made from transparent material.

The lower compressing meanses 340 are assembled with the lower curved part 322 of the lower case 320 in such a manner that they are spaced at a predetermined interval from the upper compressing meanses 330. At this time, a plurality of compressing meanses can be assembled with the lower curved part 322 in such a manner that they are spaced from each other in front and rear directions while having a predetermined interval. Also, one lower compressing means can be also positioned within a range of the circumferential periphery of the lower case 320.

Herein, it is preferable that the lower compressing meanses 340 and the upper compressing meanses 330 are spaced from each other while having an interval between them, which can allow the compressing meanses 350 to compress the tape 202 disposed between the upper and lower cases 310 and 320 when the upper case 310 and the lower case 320 are assembled with each other.

In order to allow such compressing meanses 350 be assembled with the upper curved part 312 and the lower curved part 322 while making completely close contact with them, it is preferable that such compressing meanses 350 have a thin plate shape and are made from material having elastic force and a high friction coefficient, such as natural rubber, compound rubber, and urethane.

Particularly, a tape 202 of the typical tape measure 200 is made from stainless steel so that the tape 202 can be engaged between the upper case 310 and the lower case 320 and is compressed and fixed by means of the compressing means 350. Therefore, as described above, the tape 202 is made from material having elastic force and a high friction coefficient so as to prevent the tape 202 from being deteriorated and to effectively provide fixing force.

Particularly, in a case where each upper compressing means 350 is made from a transparent material, it is preferable that another compressing means 350, which is made from material having elastic force and a high friction coefficient, is additionally assembled with a portion of the upper compressing means 350, which is assembled with the upper case 310 except the graduation checking part 222.

The fixing means 360 extends through the fixing hole 314 of the upper case 310 so as to be assembled with the assembling groove 324 of the lower case 320. If any fixing means can maintain a firmly assembled state between the upper case 310 and the lower case 320 and can be easily disassembled from them, there is no problem what the fixing means is used. Preferably, screws can be used as a fixing means, but the fixing means is not limited to screws.

FIGS. 6 to 10 are sectional views of main parts of the upper case and the lower case of the arc-drawing-assisting apparatus 210 according to an exemplary embodiment of the present invention.

Figure 6:
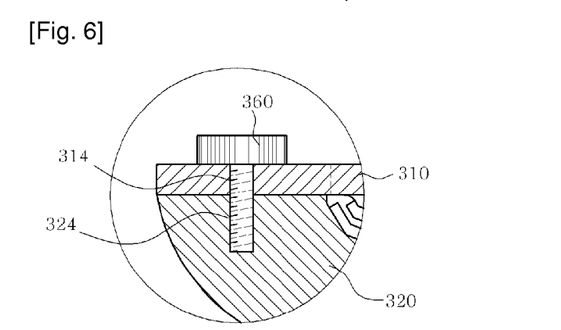
FIGS. 6 to 10 are sectional views of each main part of an upper case and a lower case of an arc-drawing-assisting apparatus according to an exemplary embodiment of the present invention.

As shown in FIG. 6, in order to allow the upper case 310 and the lower case 320, which are included in the arc-drawing-assisting apparatus according to an exemplary embodiment of the present invention, to be assembled with each other by means of the fixing means 360 made of a screw, screw threads are formed on the fixing hole 314 of the upper case 310 and the assembling groove 324 of the lower case 320. In this case, there is no problem in that the fixing hole 314 has a simple hole-shape and screw threads are formed on only the assembling groove 324.

Figure 7:
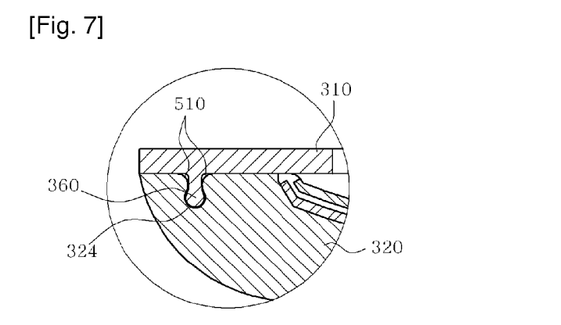

Meanwhile, as shown in FIG. 7, the fixing means 360 for fixing the upper case 310 and the lower case 320 has a protuberance-shape protruding downward and can has an end of a spherical shape.

Particularly, the fixing means 360 having a protuberance-shape protruding downward is integrally formed at a position of the upper case 310, which corresponds to the position of the fixing hole 314, The end of the assembling groove 324 of the lower case 320 has a spherical shape similar to the shape of the end of the fixing means 360 of a protuberance-shape so as to allow the fixing means 360 to be inserted in and assembled with the assembling groove 324. Also, it is preferable that the periphery of the upper end of the assembling groove 324 of the lower case 320 has a trimmed part 510 which has undergone a rounding process or a deburring process such as chamfering, etc. In a case where the upper case and the lower case are assembled with each other through the fixing means 360, the fixing hole 314 having separate screw threads and an assembling groove 324 do not need to be formed, and the fixing means 360 of a screw type to be assembled with the fixing hole 314 and the assembling hole 324 are not required so that manufacturing costs can be reduced.

Particularly, the assembling method as shown in FIGS. 6 and 7, is only an embodiment. If there is any method allowing the upper case 310 to be rotatably assembled with the lower case 320 while the tape 202 can be compressed, there is no problem in that the upper case 310 and the lower case 320 are assembled with each other through the method.

Figure 8:
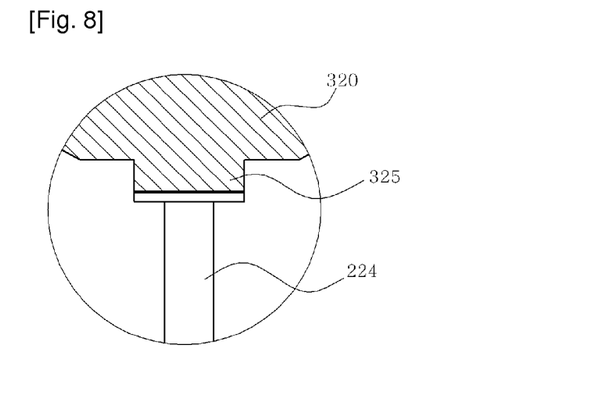

In addition, as shown in FIG. 8, there is an illustrated scheme where the center fixing pin 224 is attached to a lower end of the assembling protuberance 325 of the lower case 320 by means of adhesives, etc. so as to allow the center fixing pin 224 to be surely fixed in the center of a circle or an arc while drawing the circle or the arc, but, this scheme is only an embodiment. If there is any scheme allowing the center fixing pin 224 to be assembled with the assembling protuberance 325 so that it can be fixed in the center of a circle or an arc, the center fixing pin 224 can be assembled through this scheme.

Figure 9:
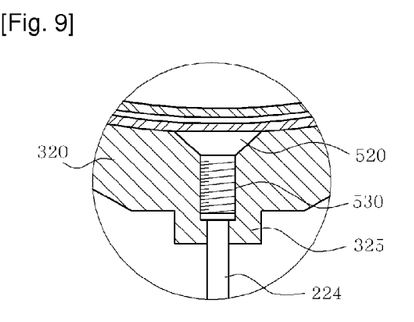

That is, as shown in FIG. 9, a screw groove 530 having screw threads formed at the center thereof is formed at the lower case 320, and a hole, through which a front end of the screw groove 530 extends to one end of the assembling protuberance 325, is formed at the lower case. The center fixing pin 224 is inserted into and is assembled with the hole by a fixing screw 520 so that the center fixing pin 224 is coupled with the assembling protuberance 325 of the lower case 320 so as to be fixed to the center of a circle or an arc.

In addition, it is preferable that an upper end of the center fixing pin 224 makes close contact with an end of a screw part of the fixing screw 520 so as to be pressured when a screw is assembled. Also, a head part of the fixing screw 520 prevents the fixing screw 520 from being exposed out of the lower case 320 so as to allow the tape 202 of the tape measure 200 to be smoothly inserted.

Figure 10:
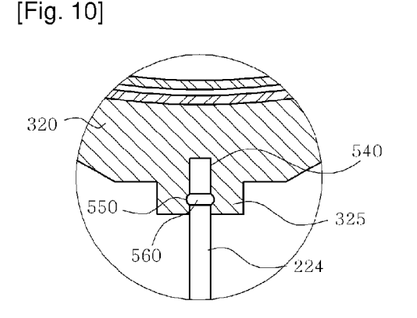

Also, as shown in FIG. 10, an inserting groove 540 is formed at a lower end of the assembling protuberance 325 while it is concaved upward, and the center fixing pin 224 is inserted into the inserting groove 540 so that the center fixing pin 224 can be fixed to the center of a circle or an arc when the circle or the arc is drawn.

That is, a ring-shaped protuberance 560 having a predetermined diameter larger than a diameter of the center fixing pin 224 is formed at a circumferential surface of the center fixing pin 224 inserted into the inserting groove 530, and this ring-shaped protuberance 560 has a size enough to be fixedly inserted in the inserting groove 540. A mounting groove 550, at which the ring-shaped protuberance 560 is mounted, is formed at a circumferential surface of the inserting groove 540 so that the assembling protuberance 325 and the center fixing pin 224 can be further fixedly assembled with each other.

Figure 11:
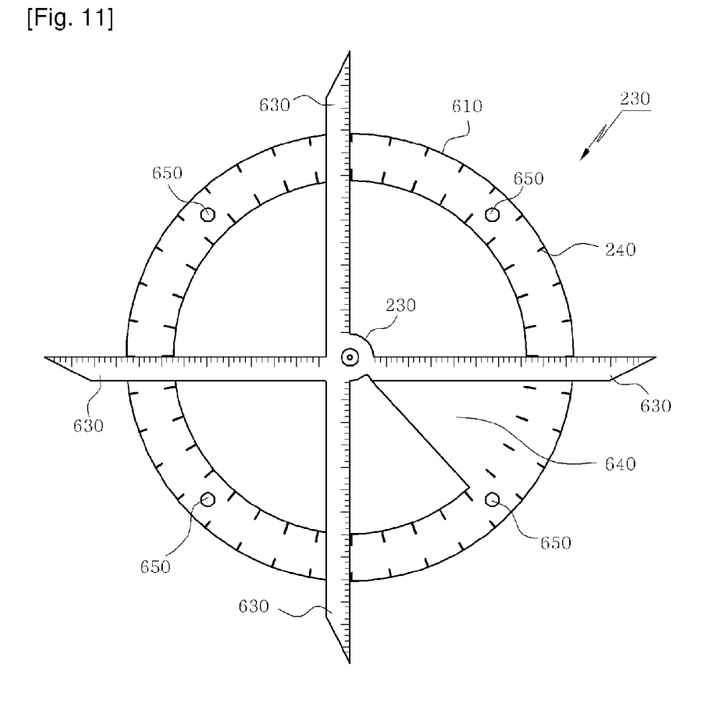
FIG. 11 is a front view illustrating a center adjusting assisting member of an arc-drawing-assisting apparatus according to an exemplary embodiment of the present invention.

As such, in addition to a method for attaching the center fixing pin 224 by means of adhesives, etc., the method for assembling the center fixing pin 224 by means of a fixing screw and a method for forming the ring-shaped protuberance 560 on the center fixing pin 224 so as to allow the center fixing pin 224 to be fitted have an advantage in that replacement of the center fixing pin 224 can be achieved in a comparatively easy manner in a case where one end of the center fixing pin 224 is worn away or damaged due to repeated use of the center fixing pin. FIG. 11 is a front view illustrating the center adjusting assisting member of the arc-drawing-assisting apparatus according to an exemplary embodiment of the present invention.

As shown, the center adjusting assisting member 230 of the arc-drawing-assisting apparatus according to an embodiment of the present invention has a donut-shape and includes a body part 610 having the angle indicator 240, which allows the user to draw a circle or an arc at each angle, disposed between an outer circumferential surface and an inner circumferential surface, and an assembling part 620, through which the assembling protuberance 325 of the center adjusting member 220 and the center fixing pin 224 are inserted and extends, included at a center portion of the body part 610. A plurality of extending pieces 630 is radially formed at the assembling part 620 so as to be assembled with the center adjusting assisting member 230 having a donut-shape.

Herein, the angle indicator 240 can be integrally formed at the center adjusting assisting member 230. Also, it is also possible that the angle indicator 240 manufactured as a separate component is attached to an upper side of the center adjusting assisting member 230 by means of adhesives, etc.

Also, the extending pieces 630 connected with the body part 610 and the assembling part 620 have graduation, such as cm, mm, inch, etc. displayed on an upper portion thereof. Furthermore, it is illustrated that the extending pieces 630 are radially arranged while having each interval at 90 degrees between them, but arrangement of the extending pieces 630 may not be limited to this. Therefore, it is also possible to arrange them while having an interval as an angle of 30 degrees, an angle of 45 degrees, and an angle of 60 degrees, etc.

In addition, an angle plate 640 having a fan-shape having a predetermined angle is formed at the extending pieces 630 and the body part 610. The angle plate 640 is formed between one side surface of one of extending pieces 630 and an inner circumferential surface of the body part 610 while having a predetermined angle so as to allow the user to easily draw a circle or an arc at each angle.

Such an angle plate 640 has an angle different according to an angle formed between the extending pieces 630. That is, if the extending pieces 630 are radially arranged while having an angle of 90 degrees between them, the angle plate 640 preferably has an angle of 45 degrees, and if the extending pieces 630 are radially arranged while having an angle of 60 degrees between them, the angle plate 640 preferably has an angle of 30 degrees.

Also, a plurality of installing holes 650 is formed along a circumference of the body part 610 of the center adjusting assisting member 230. An assisting means, which will be described below, is installed at the installing holes 650. Therefore, at least two installing holes 650 facing each other are formed so as to allow the center adjusting assisting member 230 to be stably fixed.

The arc-drawing-assisting apparatus 210 as structured above includes the assisting means allowing the user to draw a circle or an arc on various objects. In the present invention, a fastening member 700 used for drawing a circle or an arc on an object made from glass and a magnetic body 740 used for drawing a circle or an arc on an object made from metal are described.

Figure 12:
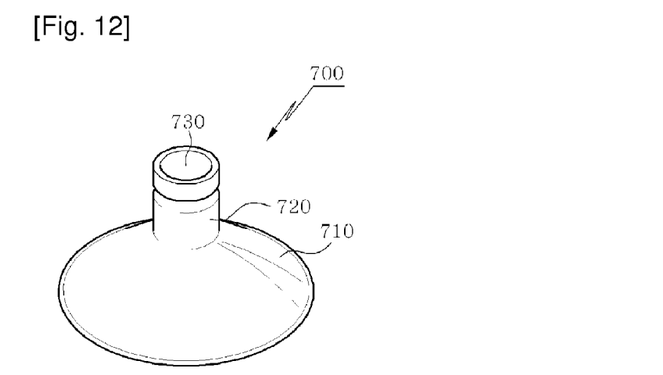
FIG. 12 is a view illustrating a fastening member of an arc-drawing-assisting apparatus according to an exemplary embodiment of the present invention.

FIG. 12 is a view illustrating the fastening member of the arc-drawing-assisting apparatus according to an exemplary embodiment of the present invention.

As shown, the fastening member 700 of the arc-drawing-assisting apparatus according to an embodiment of the present invention is used for fixing the arc-drawing-assisting apparatus 210 in a case where the user has to draw a circle or an arc on an object made from material having a smooth surface such as glass, a metallic plate, or a stone plate having a surface which has undergone a polishing process. The fastening member 700 includes an attaching plate 710 attached to a smooth surface of an object due to pressure difference and a fastening protuberance 720 formed at an upper part of the attaching plate 710 while protruding upward.

The attaching plate 710 is typically used for attaching an object to a tile, a minor, etc. used in a bathroom. When pressure is exerted to the attaching plate 710 after the attaching plate 710 is disposed at a smooth surface of an object, inner air within the attaching plate 710 flows out so that the attaching plate 710 is attached to the smooth surface due to pressure difference between atmosphere and inner state thereof.

The fastening protuberance 720 is inserted into each the installing hole 650 of the center adjusting assisting member 230 and has a cylindrical-shape of a hollow tube. Also the fastening protuberance 720 has a ring-shaped groove, which is inserted into the installing hole 650 of center adjusting assisting member 230, formed along an outer circumferential surface thereof, and has a pin fixing groove 730, into which the center fixing pin 224 is inserted. Herein, it is preferable that the pin fixing groove 730 has one end having a conical shape or a cylindrical shape so as to prevent a front end of the center fixing pin 224 from being deteriorated.

As described above, the fastening member 700 can be inserted into each installing hole 650 formed at the center adjusting assisting member 230, and it is possible to directly insert the center fixing pin 224 of the center adjusting assisting member 230 into the fastening member 700.

Figure 13:
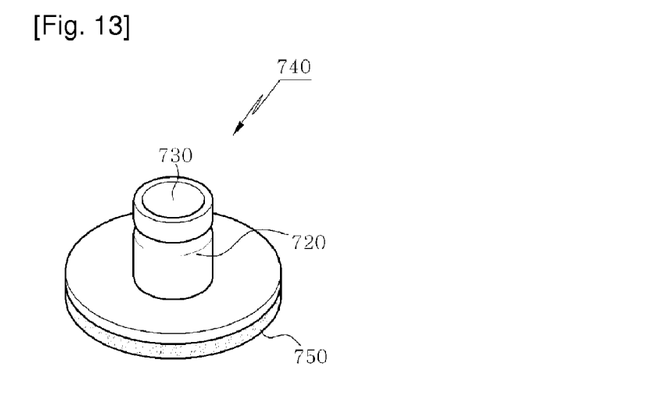
FIG. 13 is a view illustrating a magnetic body of an arc-drawing-assisting apparatus according to an exemplary embodiment of the present invention.

Also, the fastening member 700 is preferably made from material such as rubber, etc., and it is preferable that an inner circumferential surface of the pin fixing groove 730 of the fastening protuberance 720 is covered by material having an abrasion-proof property such as reinforced plastic or a metal plate. FIG. 13 is a view illustrating the magnetic body of the arc-drawing-assisting apparatus according to an exemplary embodiment of the present invention.

As shown, in order to draw a circle or an arc on a metallic plate such as a iron board, the magnetic body 740 of the arc-drawing-assisting apparatus according to an exemplary embodiment of the present invention is installed at the center adjusting member 220 or the center adjusting assisting member 230 so as to fix the center fixing pin 224.

It is preferable that such a magnetic body 740 has a fastening protuberance 720 having a cylindrical shape of a hollow tube, which is installed at the installing holes 650 of the center adjusting assisting member 230, and a pin fixing groove 730, which are formed at an upper portion of the magnetic body 740.

Also, a magnet 750 of a circular or polygonal shape, which is attached to a metallic plate such as an iron board, etc., is included at a lower portion of the magnetic body 740. However, assembling type of the magnet is not limited to such an assembling type, and it is also possible that the entirety of the magnetic body 740 is made of the magnet 750.

Figure 14:
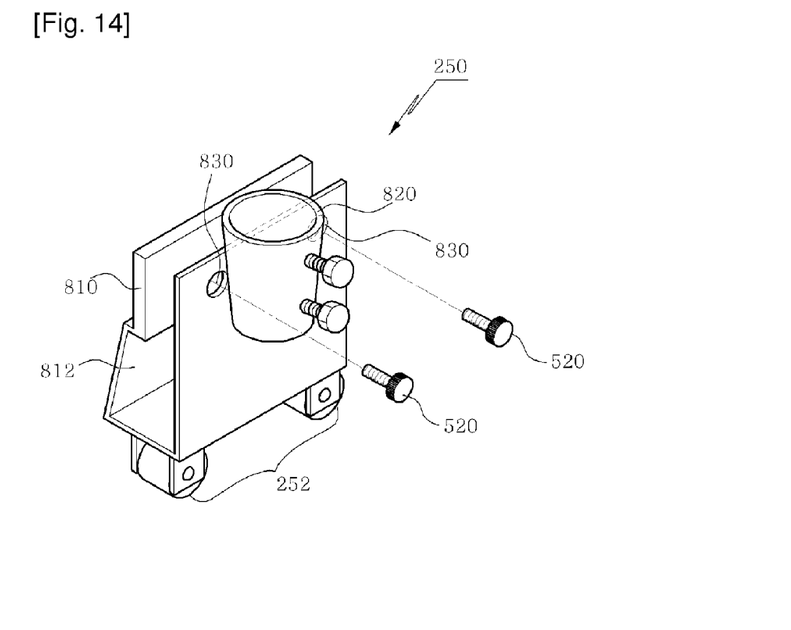
FIG. 14 is an exploded perspective view of a writing instrument fixing member of an arc-drawing-assisting apparatus according to an exemplary embodiment of the present invention.
Figure 15:
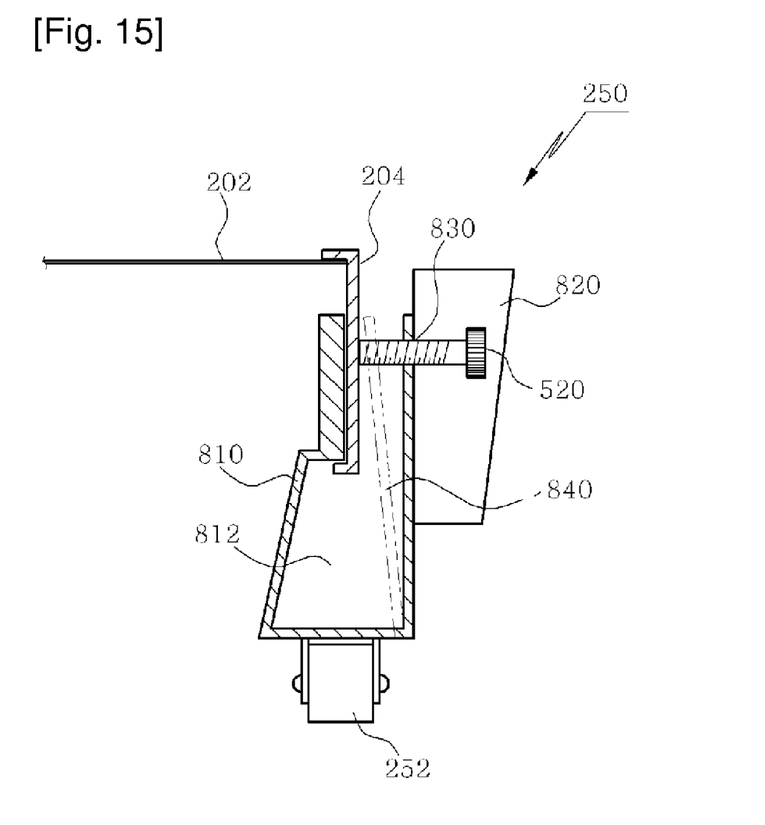
FIG. 15 is a sectional view of a writing instrument fixing member of an arc-drawing-assisting apparatus according to an exemplary embodiment of the present invention, in which the writing instrument fixing member is assembled.

FIG. 14 is an exploded perspective view of the writing instrument fixing member of the arc-drawing-assisting apparatus according to an exemplary embodiment of the present invention, and FIG. 15 is a sectional view of the writing instrument fixing member of the arc-drawing-assisting apparatus according to an exemplary embodiment of the present invention, in which the writing instrument is assembled.

As shown, the writing instrument fixing member of the arc-drawing-assisting apparatus according to an exemplary embodiment of the present invention includes a fixing panel 810, in which the fixing lock 204 formed at the front end of the tape 202 is fixed, a writing instrument holding stand 820, in which a writing instrument (not shown) is fixed, formed at one surface of the fixing panel 810, and wheels 252 included at a lower end of the fixing panel 810 so as to allow a circle or an arc to be smoothly drawn.

The fixing panel 810 has an opening 812 so as to allow the fixing lock 204 to be inserted therein, and an assembling hole 830, with which the fixing screw 520 is assembled so as to allow the writing instrument fixing member 250 to be fixed to the fixing lock 204, formed at an upper portion of the fixing panel 810. Also, the writing instrument fixing stand 820 is coupled with one surface of the fixing panel 810 by means of welding, etc.

Herein, the opening 812 can have one opened side, or can have both opened sides, i.e. has a perforation-shape.

In a case where the opening 812 has one opened side, when the fixing lock 204 included at the front end of the tape 202 is inserted in the opening while sliding through the opening 812, and the fixing screw 520 is assembled with and is fastened to the assembling hole 830, the fixing lock 204 is fastened by the fixing screw 520 so that the fixing lock 204 and the writing instrument fixing member are fixed to each other.

In a case where the opening 812 has both opened sides thereof, the fixing lock 204 is inserted into the opening 812 through one of the two sides of the opening 812 and is fixed therein by the fixing screw 520. At this time, it is preferable that the opening 812 has a width equal to a width of the fixing lock 204 so as to prevent the fixing lock 204 from being released from the opening 812, or has a predetermined width larger than the width of the fixing lock 204, which does not allow the fixing lock 204 to be released from the opening 812 of the fixing panel 810.

The writing instrument holding stand 820 allows a writing instrument, such as a pencil, a pen, etc. to be inserted therein so as to allow the user to draw a circle or an arc. The writing instrument holding stand 820 has a hollow conic shape and includes at least one assembling hole 830, at which the fixing screw 520 used for fixing a writing instrument is assembled.

The wheel 252 is made of a material such as wood having a rough surface and is disposed at a lower end of the fixing panel 810 so as to allow a circle or an arc to be smoothly drawn.

Herein, at least one wheel 252 may be included at the lower end of the fixing panel 810, and it is preferable that at least two wheels are formed at both ends of the fixing panel 810, respectively.

As shown in FIG. 15, in such a fixing member 250, the fixing lock 204 coupled with the tape 202 is inserted into the opening 812 of the fixing panel 810 in a sliding manner, and is fixed by the fixing screw 520. Then, after a writing instrument is fixed to the writing instrument holding stand 820, the user can draw a circle or an arc by the writing instrument.

Meanwhile, although not shown, if the assembling hole 830 of the fixing panel 810 is also formed at the fixing lock 204 so as to allow the fixing screw 520 to be assembled while extending through the fixing lock 204, the fixing lock 204 is firmly fixed to the fixing panel 810. At this time, the assembling hole 830 is preferably formed at both sides of the fixing panel 810 so as to allow the fixing screw 520 to extend through the fixing lock 204.

Herein, the assembling hole 830 has one side corresponding to the fixing panel 810, which has screw threads, and the other side having a simple hole-shape. Also, both sides of the assembling hole 830 can have screw threads.

Also, if the fixing panel 801 is made from resin plastic such as a thin metallic plate or reinforced plastic, etc., the fixing panel is curved along an imaginary line as shown in FIG. 15 due to fastening force of the fixing screw 520 so that much larger assembling force can be provided. Although an exemplary embodiment of the present invention has been described for illustrative purposes, those skilled in the art will appreciate that various modifications, additions and substitutions are possible, without departing from the scope and spirit of the invention as disclosed in the accompanying claims. Therefore, an exemplary embodiment of the present invention has not been described for limiting purposes so that the scope and spirit of the invention may not limited by the exemplary embodiment thereof. Accordingly, the scope of the invention is not to be limited by the above embodiments but by the claims and the equivalents thereof.

INDUSTRIAL APPLICABILITY

As described above, the present invention provides an arc-drawing-assisting apparatus, which includes a center adjusting member, which is movably disposed at a tape having graduations formed thereon and is also fixed in the tape when an arc is drawn, a center adjusting assisting member, which is assembled with the center adjusting member and has an angle indicator, and a writing instrument fixing member allowing a writing instrument to be fixed to a front end of the tape so that a circle and an arc in an accurate dimension can be drawn, and a circle and an arc having a desire angle can be drawn.

The invention claimed is:

1. An arc-drawing-assisting apparatus, which is disposed at a tape of a tape measure so as to allow a user to draw a circle or an arc by using the tape measure, the arc-drawing-assisting apparatus comprising:
   an upper case having a graduation checking part for checking graduations of the tape, the graduations checking part being formed at one surface of an upper portion of the upper case; and
   a center adjusting member which is rotatably assembled with the upper case and includes a lower case having an assembling protuberance having a center fixing pin, the assembling protuberance being formed at a lower end of the lower case while protruding downward.

2. The arc-drawing-assisting apparatus as claimed in claim 1, wherein the center adjusting member further includes a plurality of compressing meanses so as to compress the tape.

3. The arc-drawing-assisting apparatus as claimed in claim 2, wherein the compressing meanses include upper compressing meanses assembled with the upper case and lower compressing meanses assembled with the lower case.

4. The arc-drawing-assisting apparatus as claimed in claim 1, wherein a fixing hole is formed at one side surface of the upper case, and an assembling hole is formed at one side surface of the lower case, which corresponds to the fixing hole.

5. The arc-drawing-assisting apparatus as claimed in claim 4, wherein the upper case and the lower case further include a fixing means, and the fixing means is assembled with the fixing hole and the assembling groove.

6. The arc-drawing-assisting apparatus as claimed in claim 1, wherein a graduation needle is formed at the graduation checking part.

7. The arc-drawing-assisting apparatus as claimed in claim 1, wherein the assembling protuberance of the lower case has a semi-moon-shape or a circular shape.

8. The arc-drawing-assisting apparatus as claimed in claim 1, wherein an inserting groove is formed at the assembling protuberance, and a ring-shaped protuberance is formed at the center fixing pin so as to be fitted in the inserting groove.

9. The arc-drawing-assisting apparatus as claimed in claim 1, wherein the upper case further includes an angle indicator.

10. The arc-drawing-assisting apparatus as claimed in claim 1, further comprising a center adjusting assisting member assembled with the assembling protuberance of the center adjusting member so as to achieve drawing of a circle or an arc.

11. The arc-drawing-assisting apparatus as claimed in claim 10, wherein the center adjusting assisting member comprises:
　a body part, which has a donut-shape and includes an angle indicator;
　an assembling part formed at a center portion of the body part, the assembling protuberance and the center fixing pin being inserted into the assembling part while extending through the assembling part; and
　an extending piece connecting the assembling part and the body part with each other.

12. The arc-drawing-assisting apparatus as claimed in claim 11, wherein an angle plate having a predetermined angle is further included at the extending piece and the body part.

13. The arc-drawing-assisting apparatus as claimed in claim 10, wherein the center adjusting assisting member has a plurality of installing holes formed along a circumference of the center adjusting assisting member.

14. The arc-drawing-assisting apparatus as claimed in claim 10, wherein the center adjusting assisting member further includes a fastening member so as to allow the user to draw a circle or an arc on an object having a smooth surface.

15. The arc-drawing-assisting apparatus as claimed in claim 14, wherein the fastening member includes an attaching plate attached to a smooth surface due to pressure differences and a fastening protuberance formed at an upper portion of the attaching plate while protruding upward, and a pin fixing groove is formed at the fastening protuberance.

16. The arc-drawing-assisting apparatus as claimed in claim 10, wherein the center adjusting assisting member further includes a magnetic body so as to allow the user to draw a circle or an arc on an object made from metallic material such as an iron board.

17. The arc-drawing-assisting apparatus as claimed in claim 1, wherein a writing instrument fixing member is further included at a front end of the tape of the tape measure.

18. The arc-drawing-assisting apparatus as claimed in claim 17, wherein the writing instrument fixing member comprises:
　a fixing panel having an opening part formed at one surface of the fixing panel so as to allow the front end of the tape to be inserted into the opening part;
　a writing instrument holding stand fixed to one surface of the fixing panel so as to allow a writing instrument to be fixed; and
　a wheel included in a lower portion of the fixing panel.

19. A tape measure including an arc-drawing-assisting apparatus, the tape measure comprising:
　a tape, on which graduations are displayed;
　a case receiving the tape;
　a fixing lock which is included at a front end of the tape and is fixed by a rivet;
　a center adjusting member which includes an upper case having a graduation checking part for checking graduations of the tape and a lower case, which is rotatably assembled with the upper case and includes an assembling protuberance having a center fixing pin, which is formed at a lower end of the lower case while protruding downward;
　a center adjusting assisting member assembled with the assembling protuberance of the center adjusting member so as to achieve drawing of a circle or an arc at each angle; and
　a writing instrument fixing member assembled with the fixing lock included at the front end of the tape so as to fix a writing instrument.

20. The tape measure as claimed in claim 19, wherein the center adjusting member further includes a plurality of compressing meanses so as to compress the tape.

21. The tape measure as claimed in claim 19, wherein the center adjusting assisting member comprises;
　a body part, which has a donut-shape and includes an angle indicator;
　an assembling part, in which the assembling protuberance and the center fixing pin are inserted and extends, formed at a central portion of the body part; and
　an extending piece connecting the assembling part and the body part with each other.

22. The tape measure as claimed in claim 21, wherein a fastening member is further included in the center adjusting assisting member so as to allow a user to draw a circle or an arc on an object having a smooth surface.

23. The tape measure as claimed in claim 22, wherein a magnetic body is further included in the center adjusting assisting member so as to allow the user to draw a circle or an arc on an object made of metallic material, such as an iron board.

24. The tape measure as claimed in claim 19, wherein the writing instrument fixing member comprises:
　a fixing panel having an opening part formed at one surface of the fixing panel so as to allow the front end of the tape to be inserted into the opening part;
　a writing instrument holding stand fixed to one surface of the fixing panel so as to allow a writing instrument to be fixed; and
　a wheel included at a lower portion of the fixing panel.

\* \* \* \* \*